Jan. 3, 1956 R. H. WISE 2,729,507
WINDSHIELD WASHER CONSTRUCTION
Filed Aug. 21, 1952
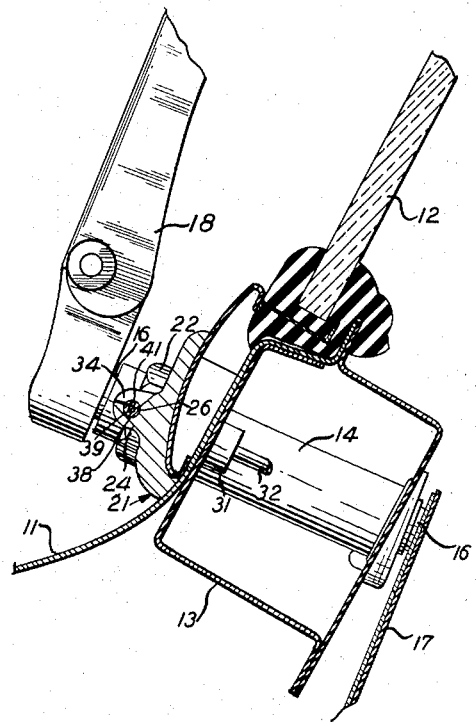
FIG. 1
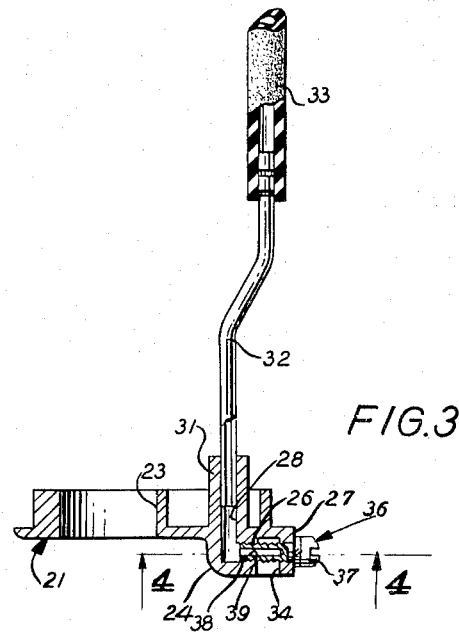
FIG. 3
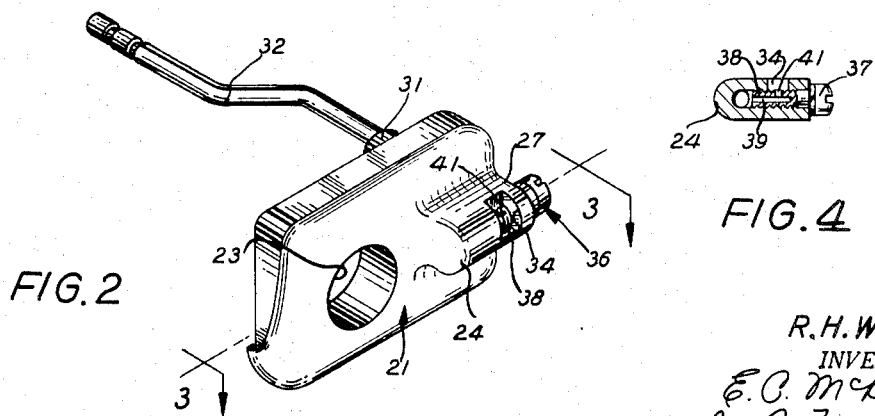
FIG. 2
FIG. 4
R. H. WISE
INVENTOR.
BY E. C. McRae
J. R. Faulkner
J. H. Oster
ATTORNEYS

United States Patent Office 2,729,507
Patented Jan. 3, 1956

2,729,507
WINDSHIELD WASHER CONSTRUCTION

Ralph H. Wise, Wayne, Mich., assignor to Ford Motor Company, Dearborn, Mich., a corporation of Delaware Application August 21, 1952, Serial No. 305,571

2 Claims. (Cl. 299—151)

This invention relates generally to a windshield washer construction, and particularly to the means for directing the windshield washing fluid onto the windshield in the path of the windshield wiper blade.

Windshield washers are currently installed as optional equipment upon many passenger vehicles today, and the percentage of vehicles which are thus equipped with windshield washers is sufficient to justify a production installation in the cowl of the vehicle forming passageways therethrough for the conduit of fluid from the windshield washer actuator to a suitable nozzle arranged to direct fluid onto the windshield in the path of the wiper blade. The bezel surrounding the windshield wiper pivot shaft and mounted upon the exterior surface of the cowl has heretofore been used for this purpose, and the passageway integrally formed therein has been plugged with a screw which can be removed and replaced with a nozzle in the event the vehicle is to be equipped with the windshield washer. It is an object of the invention, in a construction of the type described above, to eliminate the need for a separate nozzle when the vehicle is to be equipped with a windshield washer and to provide a single element which functions both as a plug when a windshield washer is not used and as a nozzle when the vehicle is to be equipped with a washer. It is a further object of the invention to obtain the advantages of this improvement without materially adding to the initial cost of the vehicle so as not to place a burden upon vehicles which are not to be equipped with windshield washers, and at the same time to effect a saving for those vehicles which are to be equipped with windshield washers.

Other objects and advantages of this invention will be made more apparent as this description proceeds, particularly when considered in connection with the acompanying drawings, wherein:

Figure 1 is a cross-sectional view through the cowl and windshield of a motor vehicle incorporating the present invention.

Figure 2 is a perspective view of a portion of Figure 1.

Figure 3 is a cross-sectional view taken on the plane indicated by the line 3—3 of Figure 2.

Figure 4 is a cross-sectional view taken on the plane indicated by the line 4—4 of Figure 3.

With reference now to the drawings, and particularly to Figure 1, the reference character 11 indicates the cowl of a motor vehicle of the passenger type, and 12 the windshield thereof. A conventional box section cowl support 13 extends laterally and forms a support for the cylindrical pivot shaft housing 14 which extends through aligned openings in the forward and rearward walls of the box section cowl support. A pivot shaft 16 is rotatably journaled in the housing 14 and at its rearward end supports a crank arm 17, the latter being adapted to be oscillated by a suitable conventional windshield wiper motor and linkage (not shown).

The forward end of the pivot shaft 16 extends through the cowl and carries at its extremity a conventional windshield wiper arm 18 which in turn supports a conventional windshield wiper blade (not shown) engaging the windshield of the vehicle and oscillatable thereon to wipe the windshield.

The projecting forward end of the pivot shaft 16 is embraced by a bezel 21 which cooperates with a nut 22 threaded on the forward end of the pivot shaft housing 14 to clamp the latter to the box section cowl support 13.

Referring now particularly to Figures 2, 3 and 4 it will be noted that the bezel 21 comprises a die casting of generally rectangular shape having an enlarged hole 23 formed therein through which the cylindrical pivot shaft housing 14 extends. At one side of the enlarged opening 23 the bezel is formed with the integral elongated boss 24 projecting outwardly from the outer face of the bezel.

A laterally extending threaded bore 26 is formed in the elongated boss 24 of the bezel with one end of the bore opening into the end wall 27 of the boss. The threaded bore 26 extends generally horizontal and parallel to the windshield 12 of the vehicle.

The bezel 21 is also formed with a second bore 28 extending generally at right angles to the threaded bore 26 and intersecting the end of the latter to provide communication therebetween. The bore 28 extends generally at right angles to the rearward wall 29 of the bezel and through a rearwardly extending cylindrical projection 31 integrally formed with the bezel. The forward end of a brass tube 32 is inserted into the bore 28 in the cylindrical projection 31, being suitably brazed therein. The rearward end of the brass tube 32 is coupled to a rubber hose 33 which extends to the pressure source (not shown) of the windshield washer. It will thus be apparnet that windshield washing fluid under pressure is adapted to be supplied through the tube 32 and bore 28 to the threaded bore 26 formed in the elongated boss of the bezel.

Intermediate its ends the elongated boss of the bezel is formed with an opening 34 through the wall thereof and intersecting the threaded bore 26. Although shown as a rectangular slot, the opening 34 may take any other suitable form, such as a circular hole, and may be formed during the casting operation or may be machined or drilled later.

The reference character 36 indicates a screw adapted to be received within the threaded bore 26 of the bezel boss. The screw may be a standard item having an enlarged slotted head 37 and a threaded shank 38. The shank 38 of the screw is formed with an axial passageway 39 extending partly therethrough and opening into the end of the screw shank. Intersecting the axial passageway 39 in the screw shank is a radial port 41. The port 41 is so located that when the screw 36 is threaded into the bore 26 in the bezel boss the port will be axially aligned with the opening 34 through the wall of the boss.

It will be seen that the screw 36 may be rotated so that the port 41 thereof is in alignment with the opening 34 through the boss in which position the port forms a nozzle through which washing fluid may be ejected and directed onto the windshield. The dimension of the opening 34 through the boss in a direction circumferentially of the bore 26 therethrough is sufficient to permit the screw 36 to be rotated through a predetermined angular extent while maintaining the port 41 in alignment with the opening 34. Thus, the screw may be adjusted so that the port 41 directs the washing fluid at various angles so that the most effective direction can be selected for ejecting the fluid onto the windshield in the path of the wiper blade.

The screw 36 may also be rotated so that the port 41 therethrough will not be in alignment with the opening 34 through the bezel boss and the port will be blocked by the internal wall of the bore 26. A lock washer 42 is positioned beneath the head 37 of the screw and serves to lock the screw in the position to which it has been adjusted.

With the construction described above, each vehicle may be identically equipped regardless of whether or not a windshield washer is to be installed either during production of the vehicle or at a later date. In the event the vehicle is not equipped with a washer, the screw 36 is turned to a position such that the port 41 is out of alignment with the opening 34 through the boss so that the port is blocked and the passageway through the bezel plugged. In the event it is desired to equip any particular vehicle with a windshield washer, it is only necessary to turn the screw 36 so as to bring the port 41 thereof into alignment with the opening 34 through the boss. The port then operates as a nozzle to direct fluid from the washer mechanism onto the windshield. Thus it will be seen that no additional parts are required to adapt the bezel construction to windshield washer operation. Only a simple adjustment of the screw 36 is necessary.

Although the construction of the present invention is shown as applied to a bezel mounted upon the cowl and surrounding the pivot shaft housing, the invention may also be applied to a bracket or other member mounted separately from the pivot shaft housing.

It will be understood that the invention is not to be limited to the exact construction shown and described, but that various changes and modifications may be made without departing from the spirit and scope of the invention, as defined in the appended claims.

What is claimed is:

1. A discharge nozzle unit comprising a bezel member having an elongated threaded hole therein, means for supplying fluid under pressure to said threaded hole, said member also having an opening through the wall thereof intersecting said threaded opening, and a plug having a threaded shank adapted to be received in the threaded opening in said member, said plug having a passageway therein communicating with the interior of the threaded hole in said member and opening into the peripheral surface of said plug so that in one position of said plug in the threaded hole the open end of said passageway is in alignment with the opening through the wall of said member and in another position of said plug said passageway is blocked by the internal wall of said threaded hole.

2. The structure defined by claim 1 which is further characterized in that the passageway in said plug has a portion extending axially through said plug and opening into the end of said plug and a second portion intersecting the first portion of said passageway and extending radially outwardly therefrom to the periphery of the threaded shank of the plug, and the opening in the wall of said member extends generally vertically upwardly from the threaded hole in said member so that the radially extending portion of the passageway in said plug when aligned with the opening in said member directs fluid upwardly.

References Cited in the file of this patent

UNITED STATES PATENTS

| | | |
|---|---|---|
| 2,153,519 | Horton | Apr. 4, 1939 |
| 2,206,814 | Horton | July 2, 1940 |
| 2,289,650 | Horton | July 14, 1942 |
| 2,633,385 | Ziebolz | Mar. 31, 1953 |